United States Patent
Anglin et al.

(10) Patent No.: US 7,519,658 B1
(45) Date of Patent: Apr. 14, 2009

(54) AUTOMATIC BLOGGING DURING MEDIA VIEWING

(75) Inventors: Howard N. Anglin, Austin, TX (US);
Yvonne M. Young, Elgin, TX (US);
Elizabeth Silvia, Austin, TX (US);
Emily J. Ratliff, Austin, TX (US);
Chaitanya Kandagatla, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/114,257

(22) Filed: May 2, 2008

(51) Int. Cl.
*G06F 15/16* (2006.01)
(52) U.S. Cl. ................................. 709/203; 709/205
(58) Field of Classification Search .................. 709/203, 709/205
See application file for complete search history.

(56) References Cited

U.S. PATENT DOCUMENTS

| | | | |
|---|---|---|---|
| 5,663,757 | A | 9/1997 | Morales |
| 7,275,096 | B2 | 9/2007 | Green |
| 7,421,429 | B2 * | 9/2008 | Thota ............................. 707/7 |
| 2002/0080166 | A1 | 6/2002 | Sweatt, III et al. |
| 2003/0056218 | A1 | 3/2003 | Wingard et al. |
| 2003/0140343 | A1 | 7/2003 | Falvo et al. |
| 2004/0055017 | A1 | 3/2004 | Delpuch et al. |
| 2004/0148353 | A1 | 7/2004 | Karaoguz et al. |
| 2004/0178923 | A1 | 9/2004 | Kuang |
| 2005/0060754 | A1 | 3/2005 | Simyon |
| 2005/0162569 | A1 | 7/2005 | Fairhurst et al. |
| 2005/0273489 | A1 * | 12/2005 | Pecht et al. .................. 709/203 |
| 2006/0221173 | A1 | 10/2006 | Duncan |
| 2007/0130582 | A1 | 6/2007 | Chang et al. |
| 2007/0288978 | A1 | 12/2007 | Pizzurro et al. |
| 2008/0104246 | A1 | 5/2008 | Katz et al. |
| 2008/0183694 | A1 * | 7/2008 | Cane et al. ...................... 707/5 |
| 2008/0183811 | A1 | 7/2008 | Kotras et al. |

OTHER PUBLICATIONS http://www.joost.com/whatsjoost.html, http://web.archive.org/web20070117031708/http://joost.com/, Jan. 17, 2007.

* cited by examiner

Primary Examiner—Kenny S Lin
(74) Attorney, Agent, or Firm—Leveque IP Law, P.C.

(57) ABSTRACT

A method, system and apparatus provide for automatic blogging of media viewing using an enhanced remote controller having networking capabilities that support social networking and blogging. The enhanced remote controller, suitable for use while viewing media programming and content, allows a viewer to autoblog about currently experienced media programming in real-time without having to resort to direct interaction with a computer to perform the autoblogging. The enhanced remote controller allows the viewer to both communicate with a blogging server, and thus to a blogging service, as well as to display responses to and from other bloggers with whom the viewer is communicating. These blog communications may be accomplished without the viewer having to leave the broadcast receiver of the television.

1 Claim, 2 Drawing Sheets

AUTOMATIC BLOGGING DURING MEDIA VIEWING

BACKGROUND

Technology advances continue to support people's need to stay connected to one another more readily and more quickly. Whether it is the desire to keep and share lists of books that have been read, comments about movies that have been seen, music that has been listened to, or television shows of interest, more than ever, people wish to be able to share their comments with others in real-time as they experience life. In the case of television, for example, one of the joys of watching television is discussing with one's friends the juicy bits of a favorite show or the latest television program.

Microblogging and social networking is increasing in popularity as a way for people to send one another short situational, status-oriented messages. This technology has the advantage of allowing people to communicate readily and quickly as events in their life occur. According to Wikipedia, Twitter is a free social networking and micro-blogging service that allows users to send short text-based messages or updates, referred to as "tweets", to the Twitter website via a third-party application, such as a short message service (SMS) available on a cellular phone, for example, instant messaging, or other third-party application such as Facebook or Joost. JoostBook is plug-in for Joost, a system for distributing TV shows and other forms of video over the Web (Internet) using peer-to-peer technology. Joost requires, however, that a user watch television on their computer, since it has an interface that integrates with computers, such as a PC or a Mac.

Current microblogging and social networking approaches, then, do not allow for a viewer of a TV program, music or other media to readily autoblog in real-time about programs being viewed without use of a computer. Thus, a viewer watching television or listening to music in the ordinary way, i.e. with the television screen and remote controller or with a music program controlled by a remote controller, cannot readily participate in current microblogging opportunities.

BRIEF SUMMARY

In accordance with embodiments consistent with the present invention, a method and system provides for automatic blogging during media viewing. A viewer selects a media program to view by use of a remote controller with networking capability. Upon the viewer wishing to send a blog posting to a blog, the viewer determines whether a tag to be included in the blog posting is to be a pre-existing tag or a custom tag, wherein the blog posting comprises program information about the media program useful to identify the media program. If the tag is to be a pre-existing tag, the viewer selects the pre-existing tag from a plurality of pre-existing tags using the remote controller and if the tag is to be a custom tag, the viewer generates the custom tag using the remote controller. If a protocol provided by the remote controller to send the blog posting to the blog allows a snapshot of the media program to be included in the blog posting, the remote controller takes the snapshot of the media program and includes it in the blog posting. If, however, the protocol provided by the remote controller does not allow a snapshot of the media program to be included in the blog posting, a snapshot of the media program is not included in the blog posting. The remote controller then sends the blog posting, in whatever form chosen, to a blogging server coupled to a blogging service. The viewer is able to receive messages from the blogging service and/or other bloggers using the blogging service, by using the remote controller.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION

In accordance with embodiments consistent with the present invention, a method and system provides for automatic blogging during media viewing using an enhanced remote controller having networking capabilities that support social networking and blogging, including microblogging. As used herein, media includes but is not limited to television programming, movies, music that is viewed, i.e. watched or listened to or both, using the aid of a remote controller device or function.

Figure 1:
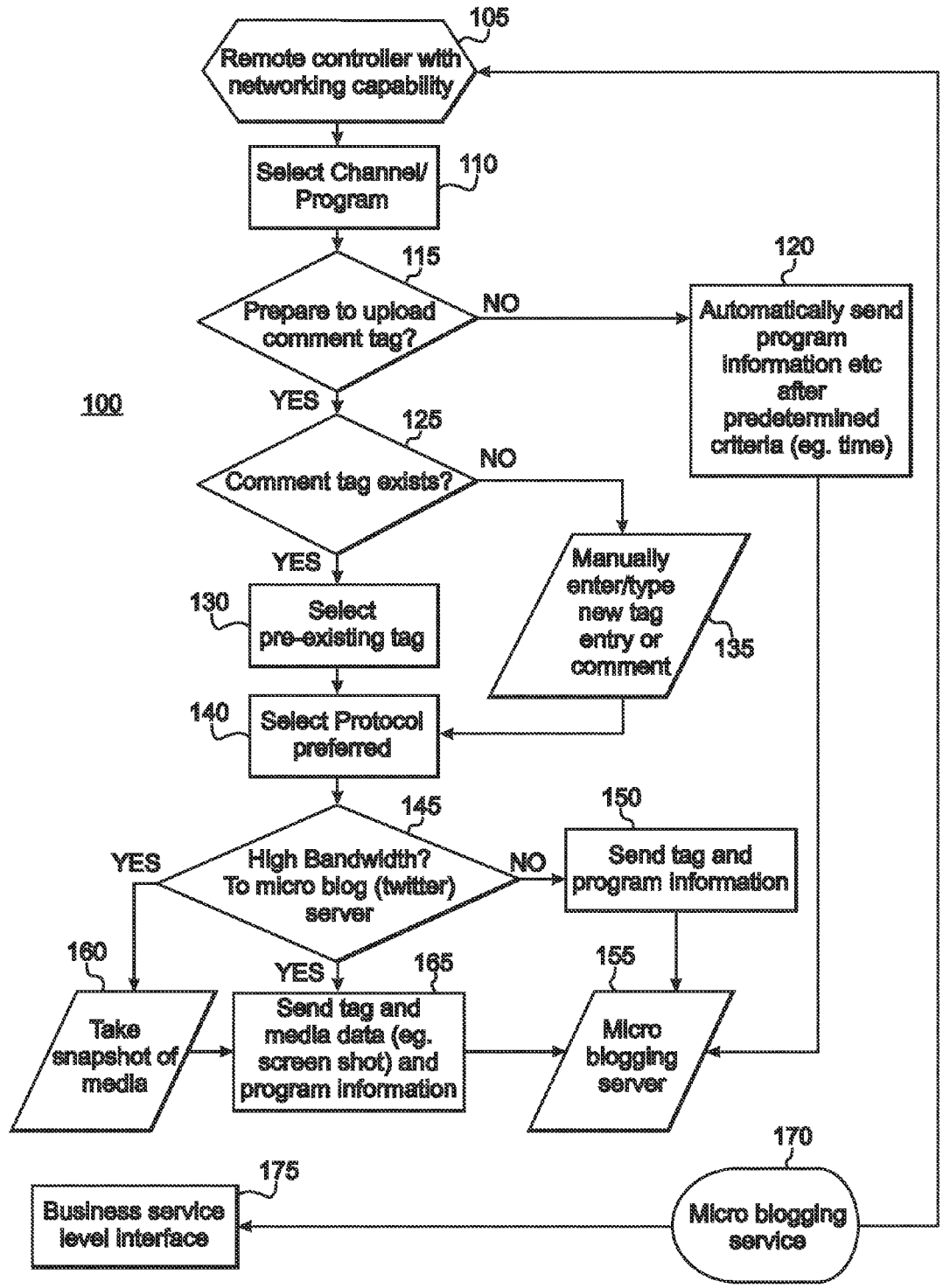
FIG. 1 is a flowchart that illustrates an exemplary flow for automatic blogging during media viewing, in accordance with various embodiments disclosed herein.

Referring now to the drawings, flowchart 100 of FIG. 1 illustrates a flow for automatic blogging during media viewing. At Block 105, a viewer of media, such as a person watching television, has an enhanced remote controller. The remote controller is suitable for use with media viewing, including television viewing and audio listening, and has networking capabilities that support a user of the remote controller sending micro-blogging messages to an Internet-based blog. The remote controller has access to media content data from a variety of sources. For instance, in the case of the remote controller being used to watch television, it might have access to broadcast content data from an original content producer, such as HBO. Examples of the remote controller would be a WiFi remote with networking capabilities, a remote with messaging capabilities that supports short message service (SMS), and a Wii remote or gaming console controller.

At Block 110, the media viewer selects a media program and program. The inquiry at Block 115 is whether the viewer wishes to prepare to upload a comment tag for inclusion in a blog posting to be sent to a blog about the media being experienced. If no, this indicates the viewer does not wish to send a tag to the blog but this does not preclude the remote controller from automatically sending program information about the media program without a tag to the blog upon the occurrence of one or more predetermined criteria at Block 120. An example of this would be the remote controller automatically sending program information about the media program to the blog after a predetermined period of time. Program information is information about the media program that is useful to identify the media program. For instance, the title, episode number and description of a television program is useful to identify the program being watched and will be conveyed in the blog posting. This program information may be provided to the remote controller from the content providers.

If, however, the viewer wishes to send a comment tag as part of the blog posting to be sent to the blog service providing the blog, the viewer must determine whether a tag to be included in the blog entry with the blog posting is to be a pre-existing tag or a custom tag. If a tag is to be included with the blog posting, the blog posting will include the tag and program information about the media program useful to identify the media program in the blog. The inquiry at Block 125 is whether a comment tag exists for the viewer to choose from. If yes, then the flow continues to Block 130. If not, then the flow goes to Block 135 for the viewer to create a custom tag.

At Block 130, the viewer can select a pre-existing tag from one or more choices provided to him by the remote controller. Examples of pre-existing tags may include any number of choices, such as "Lame", "My Favorite", "Secret Obsession", "Go Noles", etc., and allow the viewer to be saved the effort of manually entering information into their blog entry. Selection may be made by pressing a button or a menu option selected from a menu provided by the remote controller. In the case of a Wii remote controller, selections may be made by using gestures to signal selection. At Block 135, the viewer can generate a custom tag using the remote controller. The viewer can manually enter/type an entry or comment using the remote controller, such as by using a keyboard of the remote. Or, in the case of a Wii remote controller, gestures may be made in order to input text, which may be temporarily displayed on the display screen of a television, for instance. Audio or voice input to the custom tag may be accepted by the remote controller for the tag being created. After performing the tasks at Blocks 130 and 135, the blog posting will include program information and a tag (either custom or a selected pre-existing tag).

At Decision Block 145, it must be determined what kind of bandwidth is provided by the remote controller to transmit the blog posting to the blogging server. This is important because it will indicate whether a snapshot of the media can be included as part of the blog posting. For instance, an SMS protocol will provide for SMS text messaging, a WiFi protocol will use email or another automatic submission form, a Wii remote will provide an interactive Wii channel, and a PCP-IP protocol will provide another bandwidth. If the communication channel supported by the remote controller does not allow for a media snapshot to be included with the blog posting, then it is not included and the blog posting will comprise the program information and the tag. At Block 150, the remote controller sends the blog posting to the blogging service, which is coupled to a blogging service, such as on the Internet or Web. If, however, the protocol provided by the remote controller allows a snapshot of the media program to be included in the blog posting, the remote controller takes the snapshot of the media program at Block 160 and including it in the blog posting; in this case, the blog posting will comprise the program information, the tag, and a media snapshot. The snapshot may be a frame of a television program or a snippet of a song being heard by the viewer. At Block 165, the blog posting with the snapshot is sent to the blogging server. As indicated by the flow from Block 10 to Block 105, the blogging service communicates with the remote controller. This communication allows the viewer to receives messages, such as notifications of postings and actual postings from the blogging service and other bloggers using the blogging service. This communication is provided to the viewer through interaction with the remote controller. Blogs posted to the blog can be read on a display screen or window of the remote controller, or the remote controller may control a television on which the viewer is viewing a television program, for instance, to display these blog entries.

The blogging server may be provided a third party entity that is the same or separate from the content provider that provides the media content, such as a television or a music content provider. As mentioned, the blogging server is coupled to the blogging service, which may be a consumer blog on the Web or Internet —any communication forum in which media viewers may share information about the media they are experiencing, in real time.

At Block 175, it can be seen that that an interface may be provided to allow consumers of the blogging service to receive information about the blog postings that have been posted to the blog. Interested business parties, such as a rating agency like Nielson, advertisers, writers and producers, perhaps the actual writers and producers of the broadcast content, and blogging members, including viewers, may be interesting in interacting with the blogging service to receive this type of information. These parties may be considered to be consumers or subscribers of the "blogged" content, interesting in the information that may be gleaned about viewers and bloggers from the messages posted to the blog. For example, surveys conducted on a blog site at the blogging service might be of interest to these subscribers or consumers, an advantage being provided by the quick voting results that may be acquired from the blogging service.

Figure 2:
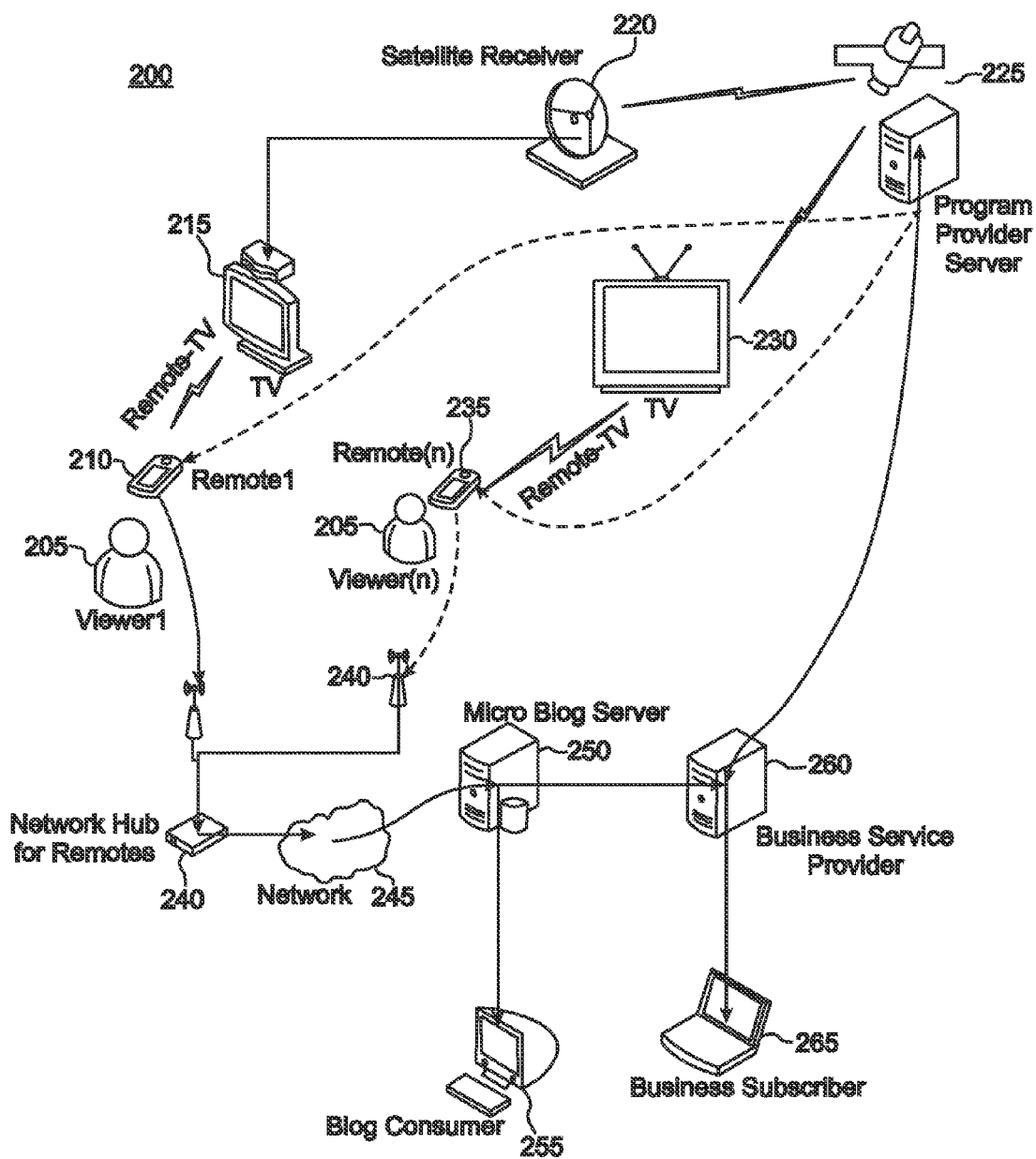
FIG. 2 is a block diagram of a system capable of automatic blogging during media viewing, in accordance with various embodiments disclosed herein.

Referring now to FIG. 2, system 200 suitable for automatic blogging during media viewing is shown. In the Figure, it can be seen that any number of viewers 205, including Viewer1 and Viewer(n) can interface with their remote controllers 210, 230 while watching media content, in this example television 215, 230, to send blog postings through their respective network hubs 240 to the Internet and then to the block server 250 as shown. In this example, media television content is provided to the viewers by program provider server 225. Business service provider 260 is operable to provide the business service level interface shown in Block 175 to business subscribers 265. The viewers 205, as well as other bloggers 255 may upload or send blog postings to the blog site supported by blog server 250 in the manner described above.

Thus, it can be seen that the use of an enhanced remote controller suitable for use with media viewing, such as television viewing or music listening, which has networking capabilities, allows a viewer to autoblog about currently experienced media programming in real-time without having to resort to direct interaction with a computer to perform the autoblogging. The enhanced remote controller allows the viewer to both communicate with a blogging server, and thus to a blogging service, as well as to display responses to and from other bloggers with whom the viewer is communicating. These notifications and postings to a blog may be accomplished without the viewer having to leave the broadcast receiver of the television. A user may see the history of shows watched and messages, such as comments/notifications posted and received through the remote controller.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A method for automatic blogging during media experiencing, comprising:
   a viewer selecting a media program to experience by use of a remote controller with networking capability, wherein the media program comprises at least one of television programming, movies, and music;
   upon the viewer wishing to send a blog posting to a blog while experiencing the media program, the viewer determining whether a tag to be included in the blog posting is to be a pre-existing tag or a custom tag with the blog posting, wherein the blog posting comprises program information about the media program useful to identify the media program;
   if the tag is to be a pre-existing tag, the viewer selecting the pre-existing tag from a plurality of pre-existing tags using the remote controller and if the tag is to be a custom tag, the viewer inputting text and/or audio to generate the custom tag using the remote controller;
   if a protocol provided by the remote controller to send the blog posting to a blogging server allows a snapshot of the media program to be included in the blog posting, the remote controller taking the snapshot of the media program and including the snapshot in the blog posting;
   if the protocol provided by the remote controller does not allow a snapshot of the media program to be included in the blog posting, not including a snapshot of the media program in the blog posting;
   the remote controller, without the user having direct interaction with a computer, sending the blog posting to the blogging server coupled to a blogging service; and
   the viewer receiving messages from one or more of the blogging service and one or more of a plurality of bloggers using the blogging service, wherein the viewer receives messages by using the remote controller.

* * * * *